United States Patent [19]

Saunders

[11] 4,201,020

[45] May 6, 1980

[54] BUILDING PANEL AND PANEL ASSEMBLY

[76] Inventor: Frederick H. Saunders, 13 McAllister St., Breakwater, Victoria, Australia

[21] Appl. No.: 821,800

[22] Filed: Aug. 4, 1977

[30] Foreign Application Priority Data

Aug. 6, 1976 [AU] Australia ............................ PC6908
Feb. 3, 1977 [AU] Australia ............................ PC8936

[51] Int. Cl.² .......................... E04C 1/10; E04B 2/28
[52] U.S. Cl. ........................... 52/580; 52/79.9;
52/220; 52/317; 52/745; 52/785
[58] Field of Search ............... 52/580, 36, 79.1, 79.9,
52/86, 90, 220, 221, 404, 582, 583, 613, 615,
741, 745, 595, 624, 368, 317, 481, 474, 785

[56] References Cited

U.S. PATENT DOCUMENTS

| | | | |
|---|---|---|---|
| 2,495,862 | 1/1950 | Osborn | 52/580 |
| 3,301,149 | 1/1967 | Box | 52/580 X |
| 3,427,055 | 2/1969 | Jureit et al. | 52/285 |
| 3,483,947 | 12/1969 | Sulewsky | 52/317 X |
| 3,699,736 | 10/1972 | Wallace | 52/580 |
| 3,861,094 | 1/1975 | Jureit et al. | 52/285 X |
| 3,969,860 | 7/1976 | Bentley | 52/404 |
| 4,005,556 | 2/1977 | Tuomi | 52/745 |

Primary Examiner—J. Karl Bell
Attorney, Agent, or Firm—Bacon & Thomas

[57] ABSTRACT

A building panel in which transverse beam segments bracing primary beams or studs are comprised of particle board. Also disclosed is an assembly of panels in which the panels are coupled by bridging a plurality of transverse beam segments in pairs by means such as respective gang nail plates. Finally, a method of construction entailing an site cutting and assembly of extended panels is described.

10 Claims, 10 Drawing Figures

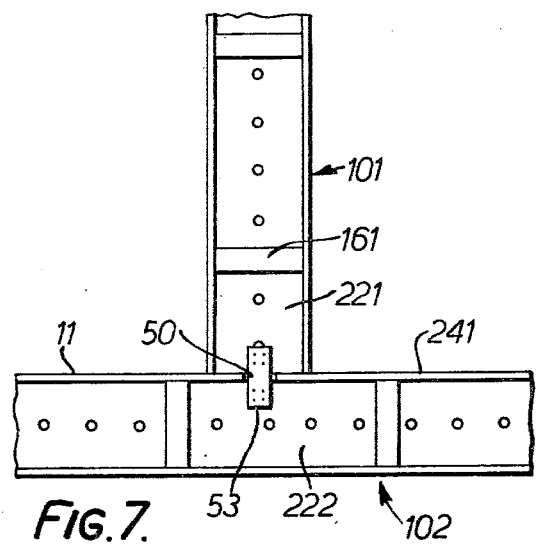
FIG.7.
FIG.8.
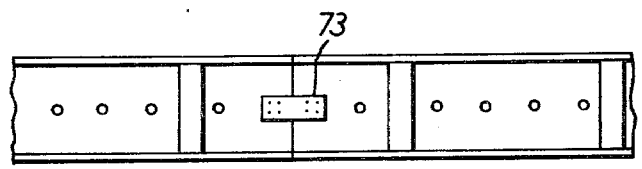
FIG.9.

BUILDING PANEL AND PANEL ASSEMBLY

This invention relates to prefabricated building panels and is more particularly concerned with providing a panel which may be utilized in the formation of the walls of a building in place of the usual in situ erection of a timber framework and wall board facing. In a specific aspect, the invention provides a novel assembly of building panels.

A major step in the conventional technique of erecting houses and other buildings of similar dimensions is the construction of a timber frame. Much of the time required by the tradesman in effecting this task is spent sizing, preparing and aligning the timber provided, and there is a considerable wastage of offcut materials. Similar costs in terms of labour and materials waste are entailed in the subsequent attachment of wallboard or like material to form the internal walls. The use of nails as the principal means of tying together the timber frame, and the weak corner connections between the wallboards, allow considerable wall movement through earth and temperature induced changes and phenomena such as cracking and warping often appear.

Prefabricated partitions and partition components are now in general use in the fitting out of office space but have to date not been employed to any significant extent in domestic construction, possibly because of a lack of satisfactory design proposals. Proposals for open core or unfilled prefabricated building panels have generally either entailed a pre-erected standard timber framed wall section or introduced a metal frame, such as that described in U.S. Pat. No. 3,363,371 to Villalobos. A more recent development in which both beams or studs and facing sheets consist of particle board is disclosed, for example, in New Zealand Pat. Nos. 165016 and 167438. In marked contrast to these arrangements, the present inventor has developed a building beam in which the elongate primary beams or studs are braced by respective pluralities of beam segments comprised of lengths of particle board.

More specifically, the invention provides a building panel comprising a facing sheet, a plurality of substantially parallel mutually spaced apart elongate primary beams secured along longitudinal faces to one side of the sheet and respective pluralities of spaced beam segments bracing each pair of said primary beams, wherein said beam segments are comprised of particle board.

It is found that by bracing the panel structures with a multiplicity of particle board beam segments which are inherently relatively stable against changes induced by moisture and temperature variations, the deforming effects of such variations or the other more susceptible components of the panels, which may, for example, comprise hardwood or pinus primary beams and gypsum board facing sheets, are substantially reduced.

The primary beams may be joined at their ends to respective metal plates defining opposed edge faces of the panel.

The building panel of the invention may contain one facing sheet only, in which case the panel would be suited to use in an external wall requiring brick veneering, or have a pair of spaced facing sheets for internal application, the primary beams and beam segments being sandwiched between the sheets.

The present inventor has also been concerned to determine an improved manner of coupling building panels to form a panel assembly such as the wall of a building. In conventional in situ construction, wall intersections require additional studs and the drawbacks already adverted to in relation to nailing frame parts together are emphasized at such locations. These techniques are either maintained in consist prefabricated panel jointing or substituted by sometimes more complex interlocking or other coupling arrangements. Bridging pieces have also been proposed, as in U.S. Pat. No. 4,019,291.

U.S. Pat. No. 3,861,094 describes the use of gang nail plates in fixing together a conventional timber building frame. The present inventor has realized that such a principle can be applied in a unique manner to the assembly of prefabricated building panels.

The invention accordingly further provides, in combination to form a panel assembly, a pair of building panels each comprising a facing sheet, a plurality of substantially, parallel mutually spaced apart elongate primary beams secured along longitudinal faces to one side of the sheet and respective pluralities of spaced beam segments bracing each pair of said primary beams, wherein the panels are coupled edge to edge by bridging together in a plurality of pairs adjacent beam segments of the respective panels, preferably by means of gang nail plates having spaced clusters of between three and seven spikes inclusive.

An especially strong and stable assembly is obtained with the building panels of the invention: the use of the gang nail plates specified to bridge particle board beam segments is enhanced by the very use of particle board as there is found to be less danger of the beam segments cracking or tearing away adjacent the spikes of the gang nail plates.

It will also be appreciated that the inventive arrangements for assembling the building panels allow joints to be made intermediate of studs without providing additional studs. Thus, erection of a structure can be carried out by cutting one or more of the building panels parallel to the primary beams to form a multiplicity of sub-panels of desired length, and erecting walls made up of such sub-panels and unreduced panels as required, the panels being coupled edge to edge by bridging together in a plurality of pairs adjacent beam segments of the respective panels. The initial panels can thus be delivered to a construction site in very long lengths and divided as required.

Preferably, all joints in the building panel are by way of an adhesive composition. By using adhesive extensively in the panel, particularly in the fixing of the sheeting to the particle board beam segments, the panel is less susceptible to warping, cracking, expansion, contraction or other deformations which would normally be expected to arise as a result of temperature and moisture induced changes in its component parts. This long term advantage is further enhanced by the strict parameter control able to be exercised in fully pre-manufacturing the panel away from the building site.

Once in situ, the sheets facing the panels would comprise the wall surfaces of a room and thus may comprise, for example, gypsum board. This material is very suitable for its excellent stability. Veneered panelling or the like may be fixed to the gypsum board. Once the walls are in place, the surfaces may be finished when appropriate by grouting the joints between panels and by providing skirtings and cornices. Roofing and ceilings are erected after provision of the internal walls as bearers, trusses and the like may be secured to the top plates of the walls.

The invention will now be described by way of example with reference to the accompanying drawings, in which.

Figure 1:
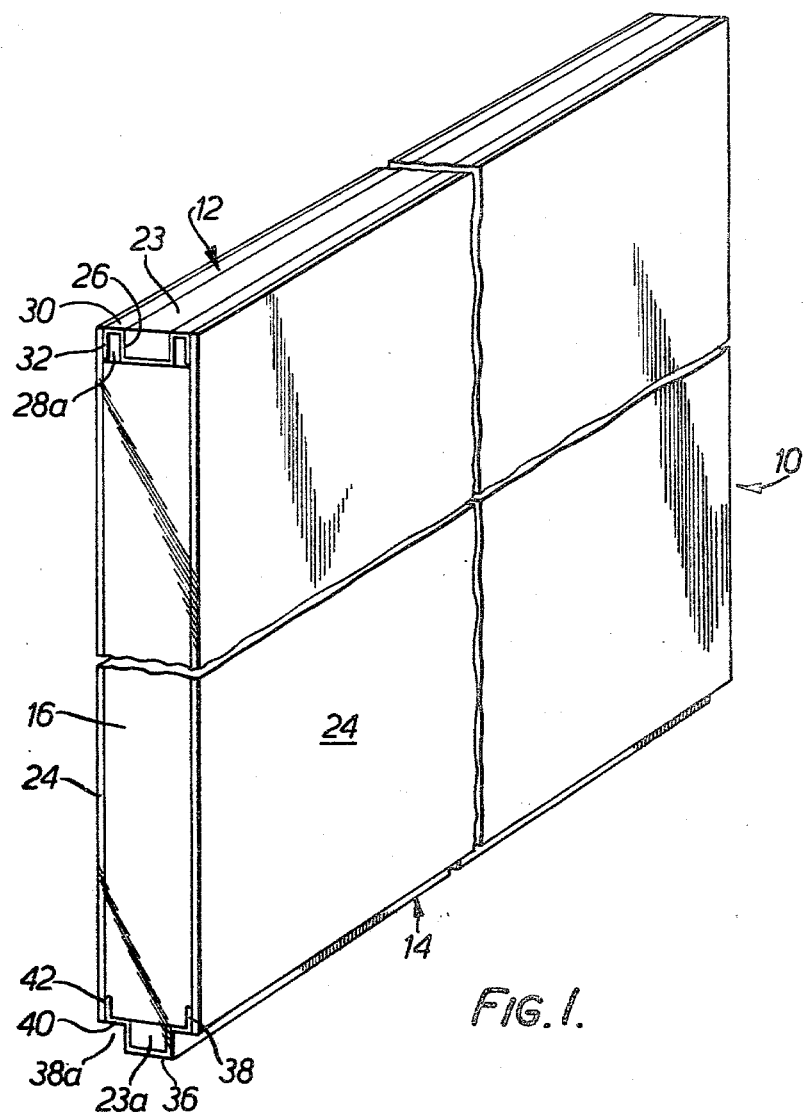
FIG. 1 is a perspective view of a building panel constructed in accordance with the invention.
Figure 2:
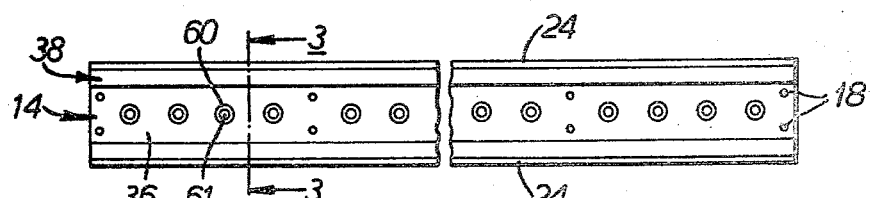
FIG. 2 is a underneath plan view of the panel shown in FIG. 1.
Figure 3:
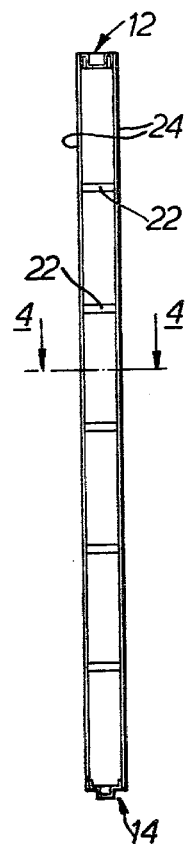
Figure 5:
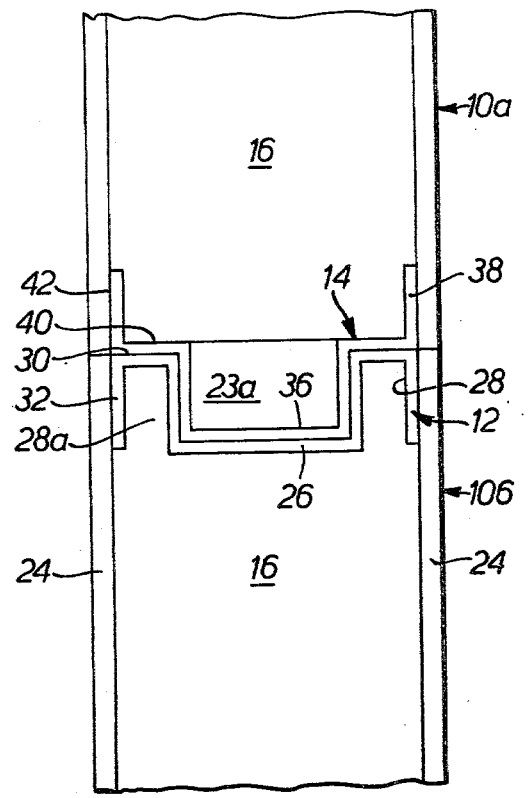
Figure 4:
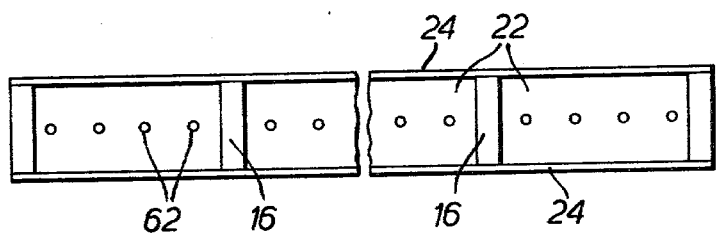
Figure 6:
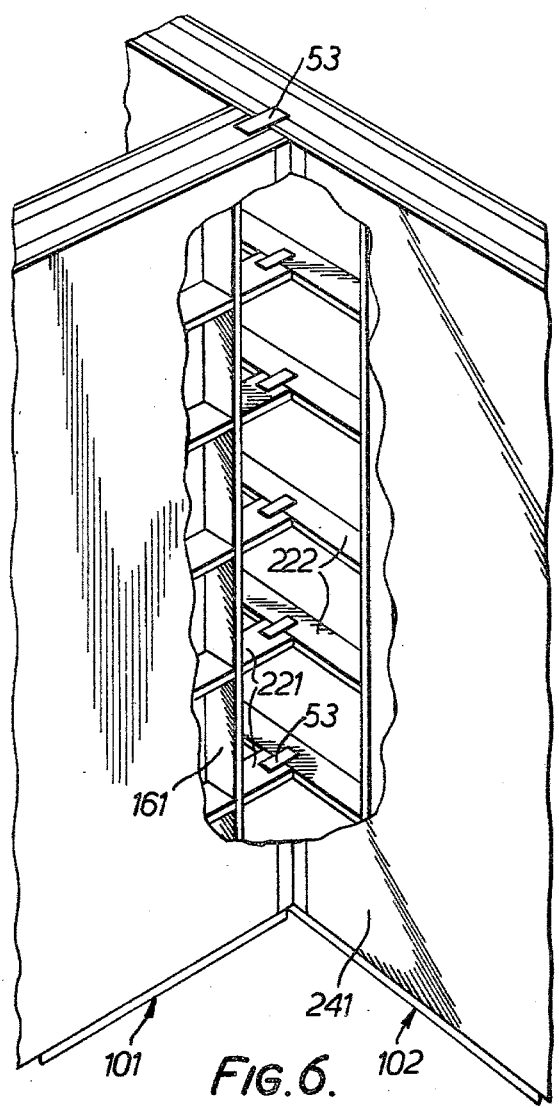
Figure 10:
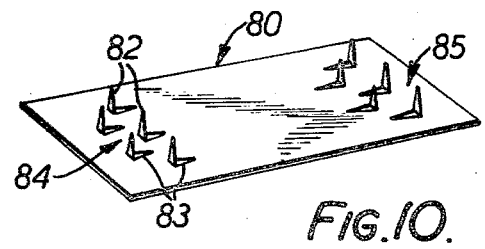

FIGS. 3 and 4 are respective cross-sectional views on the lines 3—3 and 4—4 in FIGS. 2 and 3;

FIG. 5 is a vertical fragmentary cross-section depicting edge-to-edge abutment of two of the panels depicted in FIG. 1;

FIG. 6 is a cut away perspective view of a panel assembly incorporating a T-intersection between two of the panels depicted in FIG. 1;

FIG. 7 is a representative horizontal cross-sectional view of the assembly of FIG. 6;

FIGS. 8 and 9 are views similar to FIG. 7 but show alternative assemblies of panels; and FIG. 10 is a perspective view of a gang nail plate which may be used in the assemblies of FIGS. 6 to 9.

The illustrated panel 10 is depicted as it would present itself in an upright wall or partition and will accordingly be described relative to this disposition. Panel 10 includes a top plate 12 and bottom plate 14, each being an aluminium extrusion of uniform cross-section, and a plurality of parallel primary beams or studs 16, each consisting of conventional 100×35 mm pine timber. Stronger timber, such as 100×50 mm in cross-section, might be employed where application to outside floors or multi-storey structure was intended or where additional load bearing capability was required. Respective pairs of broadhead nails 18 secure the plates to the studs, although the parts may merely be glued together with a suitable adhesive compound.

Each pair of studs 16 is braced by five equi-spaced beam segments or nogging members 22 consisting of 100×10 mm or 100×12 mm strips of particle board. A suitable board comprises pinus radiata flakes bound by a tannin formaldehyde resin. These segments are adhesively secured to the studs and at either side of the panel to respective 10 mm sheets 24 of gypsum or like board facing the sides of the panel. Sheets 24 are also adhered to the studs 16. A suitable adhesive for use in securing the parts together would have residual elasticity after activation to ensure a degree of elasticity in the overall structure.

Top and bottom plates 12, 14 are shaped to provide a mutually nestable configuration so that two of the panels may be stacked or abutted (FIG. 5) where additional wall height, or a second storey, is required. Top plate 12 includes a broad, central, upwardly open and longitudinally extending channel portion 26 from the upper edges of which extend downturned angle flanges 28. Flanges 28 provide horizontal, longitudinally extending seats 30 for roof bearers, trusses or the like and vertical faces 32 to which sheets 24 are fixed.

Bottom plate 14 includes a central, broad channel portion 36 similar to the channel portion 26 but dimensioned so that it can seat within the latter (FIG. 5). Extending integrally from the upper edges of channel portion 36 are upturned angle flanges 38 providing respective horizontal longitudinally extending shoulders 40 for supporting studs 16 and vertical faces 42 affixed to the inside bottom edges of sheets 24.

Additional strips of particle board 23, 23a are adhesively disposed in the respective channel portions 26, 36 of top and bottom plates 12, 14 with their top surfaces flush with shoulders 30, 40, unless of course channel portion 26 is to receive a second panel as in FIG. 5.

For passing water piping and electrical wiring through the interior of the panel, a plurality of runs are defined vertically through the panel by aligned apertures 60, in the top and bottom plates, 61 in strips 23, 23a (FIG. 2), and 62 in the various intermediate beam segments (FIG. 4). Apertures 61, 62 are dimensioned to snuggly fit a standard water supply pipe but are somewhat smaller than apertures 60, so as to preclude the necessity to insert insulation grommets in the latter to prevent electrical connection between the wiring and the aluminium plates. This would constitute an important saving of a trademan's time. Wiring and plumbing, heater elements and the like can also be disposed in the cavity 28a, 23a (FIG. 5) defined beside top and bottom plate channel portions 26, 36.

Where the illustrated panel was to be part of a conventional wall in a domestic dwelling, its major dimensions would suitably be 2400 mm plate-to-plate and 4500 mm between stud centres. Taking into account the component sizes given above, the thickness would be about 120 mm and the spacing between segment centres about 75 mm, a value which appears to give optimum support and stability without unjustified multiplication of beam segments. The length of the panels for delivery to the building site for pre-cutting would be determined by manufacturing and transport limitations, but 6 m is presently believed to be satisfactory.

Depending on the circumstances, and in particular on the nature of the sheets 24, it may be possible to form an intersection of panels in a wall by merely gluing the end face of one panel, defined by a stud, to a sheet 24 of the other. However, sheets 24 are preferably gypsum board which typically comprises a paper sandwiched plaster web and it has been found that the expedient of gluing two or more of the panels together at wall intersections by applying adhesive along the interface between the panels may not always be entirely satisfactory as the strong bond provided by the adhesive may not be matched by a strong bond between the paper facing the wall board and the plaster encased by the paper.

In accordance with an aspect of the invention, it is found that a very firm and secure joint permitting the panels to be cut intermediate their studs and yet not requiring additional studs may be achieved by coupling two of the panels in edge to edge relationship by bridging together in a plurality of pairs adjacent beam segments of the panels.

All matching pairs of beam segments on the two panels may be bridged. Although a small number of bridging plates appropriately spaced relative to one another and to the upper and lower extremities of the panels will often suffice, it is found that an excellent joint is achieved with bridging plates at 75 mm centres, the spacing of the beam segments in the panel of FIG. 1 where the panel is the standard 2400 mm height.

In some instances, it will of course be necessary to cut a slot in the bounding sheeting of one or both panels in order to insert the fastening plates. The corner should always be constructed so that the panels in assembly remain enclosed by their facing sheets where they had each contained sheeting on both sides prior to assembly. In that event, it may be necessary on occasion to slice one panel in such a manner that one of its facing sheets overlap the other to provide a seat for the second panel.

FIGS. 6 and 7 demonstrate a simple T-joint in which one panel 101 is sliced vertically between studs 161 and brought into abutment with one of the facing sheets 241 of the other panel 102. A slot 50 (FIG. 7) is formed in this sheet adjacent each beam segment 221, 222 and a gang nail plate 53, placed through each slot in turn and driven into the adjacent beam segments on the respective panels. To gain access for the driving implement, it may be necessary to cut and pull back a flap of wall board but this can be readily mended subsequently.

FIG. 8 illustrates the case of a right-angle joint incorporating gang nail plate 63. Here, one facing sheet 243 of one panel 103 overlaps the other sheet 244 by an amount required to seat the width of the second panel 104.

Finally, FIG. 9 shows an end-to-end butt joint between two parallel components achieved by a bridging gang nail plate 73.

A preferred form of gang nail plate is shown at 80 in FIG. 10. Spikes 82 are formed by punching out pointed pieces of plate to leave residual perforations 83. The spikes are arranged in two clusters 84, 85 each of five spikes and are shorter than the thickness of the beam segments into which they are to be driven. Clusters of three to seven are acceptable; less than three results in a substantially diminished bond and more than seven has a smaller effect arising from damage to the beam segments.

Although the plates 12 and 14 of the illustrated panel are rendered mutually nestable, they may in general be identical so that the panel is symmetrical about a plane bisecting the studs 16 and the facing sheets 24. In such a case, both plates may be of the form of plate 12 but with their respective channels 26 both facing outwardly of the panel.

I claim:

1. In combination to form a panel assembly, a pair of building panels each comprising a facing sheet, a plurality of substantially parallel, mutually spaced apart elongate primary beams secured along longitudinal faces to one side of the sheet and respective pluralities of spaced beam segments bracing each pair of said primary beams, wherein the panels are coupled edge to edge by bridging together in a plurality of pairs adjacent beam segments of the respective panels.

2. A panel assembly according to claim 1 wherein the beam segments are bridged together by means of gang nail plates having spaced clusters of between three and seven spikes inclusive.

3. A panel assembly according to claim 2 wherein the gang nail plates have five spikes in each cluster.

4. A method of construction comprising providing a building panel having a facing sheet, a plurality of substantially parallel mutually spaced apart elongate primary beams secured along longitudinal faces to one side of the sheet and respective pluralities of spaced beam segments bracing each pair of said primary beams and extending perpendicularly to the primary beams, said beam segments being comprised of particle board, cutting one or more of said building panels parallel to the primary beam to form a multiplicity of sub-panels of desired length, and erecting walls made up of such sub-panels and unreduced panels as required, the panels being coupled edge to edge by bridging together in a plurality of pairs adjacent beam segments of the respective panels.

5. A method according to claim 4 wherein the beam segments are bridged together by means of gang nail plates having spaced clusters of between three and seven spikes inclusive.

6. A panel assembly according to claim 1 wherein said beam segments are comprised of particle board.

7. A panel assembly according to claim 6, wherein each said plurality of beam segments includes five beam segments intermediate the ends of the primary beams and wherein the five intermediate beam segments on each panel are bridged together in five pairs.

8. A panel assembly according to claim 6 wherein the joints between beams and beam segments are by way of an adhesive composition.

9. A method of construction employing one or more building panels each comprising a facing sheet, a plurality of substantially parallel, mutually spaced apart elongate primary beams secured along longitudinal faces to one side of the sheet and respective pluralities of spaced beam segments bracing each pair of said primary beams and extending perpendicular to the primary beams, said method comprising cutting one or more of the said building panels parallel to the primary beams to form a multiplicity of sub-panels of desired length, and erecting walls made up of such sub-panels and unreduced panels as required, the panels being coupled edge to edge by bridging together in a plurality of pairs adjacent beam segments of the respective panels.

10. A method according to claim 9 wherein the beam segments are bridged together by means of gang nail plates having spaced clusters of between three and seven spikes inclusive.

* * * * *